United States Patent
Gehring et al.

(10) Patent No.: US 10,834,510 B2
(45) Date of Patent: Nov. 10, 2020

(54) HEARING DEVICES WITH PROACTIVE POWER MANAGEMENT

(71) Applicant: Sonova AG, Staefa (CH)

(72) Inventors: Stephan Gehring, Uerikon (CH); Manuela Feilner, Egg (CH)

(73) Assignee: Sonova AG, Staefa (CH)

( * ) Notice: Subject to any disclaimer, the term of this patent is extended or adjusted under 35 U.S.C. 154(b) by 55 days.

(21) Appl. No.: 16/156,464

(22) Filed: Oct. 10, 2018

(65) Prior Publication Data

US 2020/0120428 A1  Apr. 16, 2020

(51) Int. Cl.
*H04R 25/00* (2006.01)
*G06N 20/00* (2019.01)

(52) U.S. Cl.
CPC ........... *H04R 25/305* (2013.01); *G06N 20/00* (2019.01); *H04R 25/554* (2013.01); *H04R 2225/31* (2013.01); *H04R 2225/33* (2013.01); *H04R 2460/03* (2013.01)

(58) Field of Classification Search
CPC .... G06N 20/00; H04R 25/305; H04R 25/554; H04R 2225/31; H04R 2225/33; H04R 2460/03
See application file for complete search history.

(56) References Cited

U.S. PATENT DOCUMENTS

| | | | |
|---|---|---|---|
| 5,210,804 A | 5/1993 | Schmid | |
| 7,120,500 B1 | 10/2006 | Seligman | |
| 7,315,626 B2 | 1/2008 | Pedersen | |
| 7,508,950 B2 | 3/2009 | Danielsen | |
| 7,577,267 B2 | 8/2009 | Barthel et al. | |
| 7,602,930 B2 | 10/2009 | Kastelan | |
| 7,627,378 B2 | 12/2009 | Seligman | |
| 7,813,518 B2 | 10/2010 | Danielsen et al. | |
| 8,050,439 B2 | 11/2011 | Inoshita et al. | |
| 9,319,806 B2 | 4/2016 | Ku et al. | |
| 9,749,753 B2 | 8/2017 | Petersen et al. | |
| 9,781,521 B2 | 10/2017 | Kofod-Hansen et al. | |
| 9,913,050 B2 * | 3/2018 | Goorevich | H04R 25/30 |
| 2010/0123436 A1 | 5/2010 | Herrod et al. | |
| 2013/0272556 A1 | 10/2013 | Hamacher | |
| 2013/0316649 A1 | 11/2013 | Newham | |
| 2016/0183009 A1 | 6/2016 | Kim et al. | |
| 2017/0064461 A1 | 3/2017 | Thomsen | |

(Continued)

FOREIGN PATENT DOCUMENTS

DE  102006035103 B4  12/2010

*Primary Examiner* — Brian Ensey

(57) ABSTRACT

Systems and methods for hearing devices with proactive power management are provided. Various embodiments dynamically adapt power consumption to the preferences, needs, and behavior of the hearing device user such that the hearing device provides function until the hearing device can be recharged. Moreover, some embodiments exploit the trend of more intelligent devices and machine learning to create dynamic power management schedules which can be temporarily implemented to create an optimal blend of performance versus battery life while minimizing perception of the feature or performance reduction to the user. Moreover, the dynamic nature of the power management used in various embodiments can account for battery degradation, updated firmware, and/or other factors that may impact battery life as the hearing device ages.

22 Claims, 10 Drawing Sheets

(56) References Cited

U.S. PATENT DOCUMENTS

| | | |
|---|---|---|
| 2017/0195804 A1 | 7/2017 | Sandhu et al. |
| 2017/0195806 A1 | 7/2017 | Atamaniuk et al. |
| 2017/0215010 A1 | 7/2017 | Lineaweaver et al. |
| 2017/0215011 A1* | 7/2017 | Goldstein ............ H04R 25/305 |

* cited by examiner

HEARING DEVICES WITH PROACTIVE POWER MANAGEMENT

TECHNICAL FIELD

Various embodiments of the present technology generally relate to hearing devices. More specifically, some embodiments of the present technology relate to hearing devices with proactive power management.

BACKGROUND

Hearing devices are generally small complex devices used to improve the hearing capability of individuals. Hearing devices can be used to compensate for hearing impairments or to provide a sound source (e.g., headphones, earbuds, etc.). Some common examples of hearing devices used to compensate for hearing impairments include, but are not limited to, Behind-The-Ear (BTE) devices, Receiver-In-the-Canal (RIC) devices, In-The-Ear (ITE) devices, Completely-In-Canal (CIC) devices, and Invisible-In-The-Canal (IIC) devices. A user can select from these, or other, hearing devices based on a variety of preferences and hearing impairment needs. For example, one type of hearing device may be a preferred by an individual over another when factors such as hearing loss, aesthetic preferences, lifestyle needs, budget, and the like are considered.

With advances in technology such as improved processing and communication protocols, hearing devices have more functionality and increased performance than ever before. For example, this additional functionality can include additional signal processing techniques, Bluetooth® audio streaming from external sources such as phones or televisions, and the like. These additional features and performance mitigate the impact of the hearing impairment and allow the user of the hearing device to better interact with the environment and manage the hearing loss. Unfortunately, the addition of functionality and performance increases the load on the battery which directly increases the drain on the battery. Since larger batteries negatively affect the aesthetics of the hearing device, the users are often left replacing the battery or recharging the battery more frequently which can be expensive and inconvenient to the user. As such, techniques are needed for intelligent battery management.

SUMMARY

Systems and methods are described for proactive power management of hearing devices. In some embodiments, a method for proactive power management of a hearing device can include predicting (e.g., based on user preferences, historical usage patterns of the hearing device, current location, calendar entries, etc.) a duration of time until a refreshing (e.g., replacement or recharge) of a battery in the hearing device. The method can also estimate a remaining usage time of the battery in the hearing device. When the duration of time until refreshing is greater than the remaining usage time, an operational characteristic (e.g., performance adaptation or a functionality adaption) of the hearing device can be automatically modified (e.g., by the hearing device, smartphone application connected to the hearing device, etc.) to increase the remaining usage time of the battery in the hearing device. The operational characteristics can include performance adaptations and/or functionality adaptations. The performance adaptation can include, for example, a reduction in an amount of sound amplification, reduction or shift in bandwidth of an amplified signal, a change in a codec type, or reduction of frequency of monitoring sensors. The functionality adaptation can include, for example, a reduction in wireless functionality, a reduction in supported wireless protocols, reduction in monitoring for the presence of an inductive loop. The modification of the operational characteristics can be temporary or modified again in the future based on different predictions. As such, once a reachargeable battery is recharged, or a non-rechargeable battery is replaced, the original operational characteristics can be restored.

In some embodiments, an anticipated usage pattern of the hearing device until expected recharge (or power refresh) can be developed and the remaining usage time of the battery in the hearing device can be estimated, at least in part, on the anticipated usage pattern of the hearing device during the duration of time. In various embodiments, the remaining usage time can be estimated using hardware and software configurations of the hearing device. In some embodiments, a prioritization schedule that ranks available operational characteristics of the hearing device from the perspective of a user can be received. For example, the prioritization schedule may include a prioritization table that can be static (e.g., sound amplification is more important than wireless) or dynamic (e.g., the table is reprioritized based on the current conditions such as, but not limited to Bluetooth is more important than Wi-Fi if a Bluetooth link is already established). The operational characteristic can be selected from the prioritization schedule based on a ranking indicative of lowest importance to the user. In some embodiments, a wireless connection between the hearing device and a mobile computing device. Once the wireless connection is created, one or more operational characteristics (e.g., monitoring of public announcement systems) of the hearing device can be off-loaded to the mobile computing device.

Some embodiments provide a method for proactive power management of a hearing device that includes establishing a communication link between an external computing device and the hearing device. A date and time (or duration until) the hearing device begins a recharge cycle can be predicted. A remaining usage time of the battery in the hearing device can be estimated based on device hardware, software configurations, and anticipated usage levels until the date and time the hearing device is precited to begin the recharge cycle. An adaption profile can be generated that when implemented will temporarily modify one or more operational characteristics to minimize (or reduce) the difference between the time till next charge and the remaining usage time. The adaptation profile can be transmitted to the hearing device using the communication link. Performance adaptations can include reduction in an amount of sound amplification, reduction or shift in bandwidth of an amplified signal, a change in a codec type, or reduction of frequency of monitoring sensors. Functionality adaptation can include a reduction in wireless functionality, a reduction in supported wireless protocols, or a reduction in monitoring for the presence of an inductive loop. Depending on the functionality of the hearing device, there may be other functional adaptions which can be made to reduce power consumption.

Embodiments of the present invention also include computer-readable storage media containing sets of instructions to cause one or more processors to perform the methods, variations of the methods, and other operations described herein.

Some embodiments include a hearing device capable of optimizing battery life. The hearing device can include a processor, a battery (e.g., a rechargeable battery), a wireless communication component, and a proactive power manager. The wireless communication component can be configured to communicate with an external computing device and the proactive power manager can be configured to dynamically adjust one or more operational characteristics of the hearing device to minimize the difference between a predicted time until an initiation of a recharge cycle of the rechargeable battery and an estimate of remaining usage time. For example, the operational characteristics can include performance adaptations or functional adaptions. In some embodiments, the proactive power manager off-loads the one or more operational characteristics to the external computing device.

In some embodiments, a power learning profile module can be used to track short term and long-term activity and develop a usage profile indicative of usage of the hearing device. The power learning module can be part of the hearing device or part of the external computing device. The external computing device may be used to generate the predicted time until initiation of the recharge cycle is based, at least in part, on one or more of user preferences, historical usage patterns of the hearing device, current location, or calendar entries. Machine learning or artificial intelligence engines may be used in some embodiments to generate the predicted time until initiation of the recharge cycle or the estimate of remaining usage time.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

Figure 1:
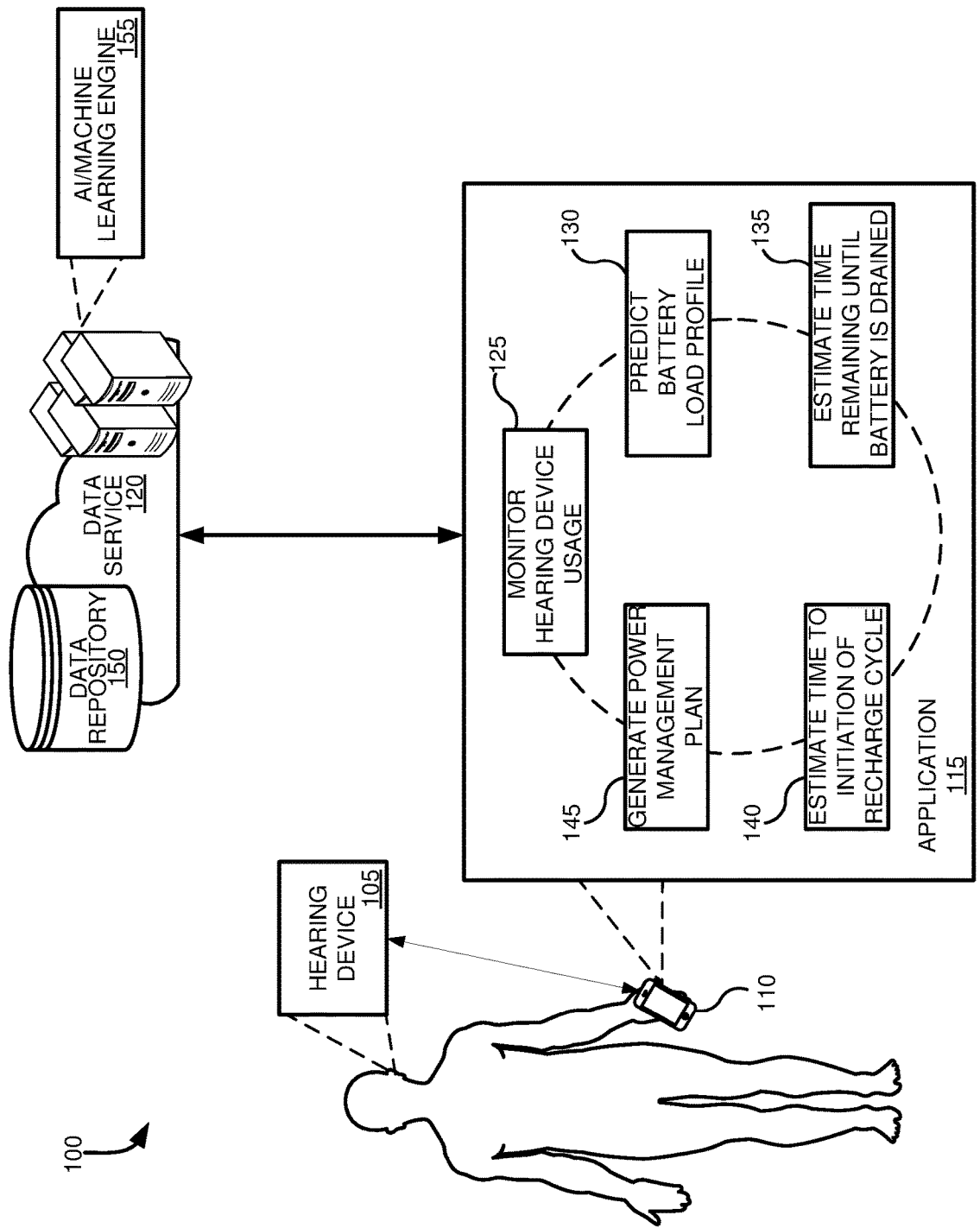
FIG. 1 illustrates an example of an environment in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to hearing devices. More specifically, some embodiments of the present technology relate to hearing devices with proactive power management. Due to their limited physical size, rechargeable hearing devices have a limited battery capacity. As users depend on their hearing devices, providing functionality until the next time the device can be charged—typically once per day—is important. If the average power consumption of the hearing device is too high, the hearing devices cannot provide their function sufficiently long and the user will need to charge the hearing device during normal wearing time and thereby cannot use the hearing device. While hearing device devices can be made larger to increase the battery capacity, such increases in size are often undesirable from an aesthetic point of view. Similarly, creating devices with limited functionality to ensure that the battery lasts for a duration defined by the hearing device manufacturer is also less than ideal.

In contrast, some embodiments provide for a hearing device (rechargeable or non-rechargeable) which adapts power consumption to the preferences, needs, and behavior of the hearing device user such that the hearing device provides function until the hearing device can be recharged. Moreover, some embodiments exploit the trend of more intelligent devices and machine learning to create dynamic power management schedules which can be temporarily implemented to create an optimal blend of performance versus battery life while minimizing perception of the feature or performance reduction to the user. Moreover, the dynamic nature of the power management used in various embodiments can account for battery degradation, updated firmware, and/or other factors that may impact battery life as the hearing device ages.

Various embodiments balance the restrictions of memory and processing power within the hearing device by allowing learning and creation of power management schedules across multiple platforms (e.g., hearing device, smartphone, and/or remote server). For example, in some embodiments a communication link may be established between the hearing device and a smartphone (or a remote server). The artificial intelligence and machine learning engines may be implemented on the hearing device, smartphone, the remote server, and/or a distributed across a combination thereof. The artificial intelligence and machine learning engine can ingest data regarding the hearing device (e.g., firmware version, processor type, model number, etc.), the user's activity (e.g., from calendar's, location data, sounds from the hearing device, functionality being used, etc.), user preferences, sensor data (e.g., from the smartphone or hearing device), and the like.

In some embodiments, the artificial intelligence and machine learning engine can use the ingested information to identify an anticipated duration until the user will initiate a recharge (or replacement) of the battery as well as generate an estimate of depletion of the battery. In at least one embodiment, data from multiple users may be used to create the estimates. Once created, these estimates can then be used to adjust one or more characteristics of the hearing device (e.g., functional adaptation or a performance adaptation) that will maximize performance while ensuring the hearing device will last until the recharge. In various embodiments, the power management profile adjusting the one or more characteristics may be also created by the artificial intelligence or machine learning engine.

Various embodiments of the present technology provide for a wide range of technical effects, advantages, and/or improvements to hearing devices, computing systems and/or related components. For example, various embodiments include one or more of the following technical effects, advantages, and/or improvements: 1) intelligent power management of hearing devices; 2) integration of machine learning and artificial intelligence engines to predict a future anticipated load on the hearing device, generate an estimate of a duration until the beginning of recharge cycle, and/or a creation of a power profile that maximizes performance while ensuring the hearing device last for the duration; 3) ability to shift selected features of the hearing device to an external computing device (e.g., a smartphone) until the next charge cycle is initiated; 4) use of unconventional and non-routine operations to automatically adapt functionality and/or performance of a hearing device based on estimated power consumption and estimated time of next charge; and/or 5) cross-platform integration of machine learning to more efficiently manage battery life.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to proactive power management of hearing devices, embodiments of the present technology are equally applicable to various other battery powered devices with selectable operating characteristics that impact battery life.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of a communications environment 100 in which some embodiments of the present technology may be utilized. As illustrated in FIG. 1, communications environment 100 may include hearing device 105, an external computing device 110 (such as a mobile phone, tablet computer, mobile media device, mobile gaming device, vehicle-based computer, wearable computing device, etc.), application 115, and data service 120. Hearing device 105 can be communicably connected to external computing device 110 via a communications link (e.g., Bluetooth®). As described in more detail below hearing device 110 and external computing device 110 can include various sensors and input/output components.

In addition, external computing device 110 can include network communication components that enable external computing device 110 to communicate with remote servers associated with data service 120 or other portable electronic devices by transmitting and receiving wireless signals using licensed, semi-licensed or unlicensed spectrum over a communications network. In some cases, the communication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Communications network 120 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Hearing device 105 can be configured to automatically (e.g., without human intervention) adapt one or more operating characteristics (e.g., functional adaptations, performance adaptations, etc.) based on estimated power consumption and estimated time of next charge (e.g., recharge of a rechargeable battery or replacement of primary cells). In some embodiments, these adaptations may be selected by a service or application running on external computing device 110 or remote server. While not illustrated in FIG. 1, hearing device 105 may connect directly with data service 120 (instead of via external computing device 110 as illustrated in FIG. 1) or just with an external computing device providing no intermediary connection to data server 120. In other embodiments, application 115 may be run directly on hearing device 105 or in data service 120.

In the embodiments illustrated in FIG. 1, external computing device 110 includes application 115 which is uses monitoring operation 125 to monitor the usage of hearing device 105, uses prediction operation 130 to develop a battery load profile over a period of time (e.g., rest of the day, next two days, etc.), uses estimation operation 135 to estimate a time or duration remaining until the battery is drained, uses estimation operation 140 to estimate a time or duration to initiation of the next recharge cycle, and uses generation operation 145 to generate a power management plan that can be implemented on hearing device 105. By using estimating the time or duration until the next recharge of the battery, the power management plan can ensure the hearing device will last sufficiently long (e.g., through the end of the day) while having the least impact on the user's experience (e.g., providing the most features).

Data service 120 can collect data about hearing device 105 via a direct communication link (e.g., via Bluetooth® or other short-range communication protocol) with hearing device 105 or via external device 110. The data collected can include model information, hardware configurations, software configurations, number of battery cycles, location, local environmental conditions (e.g., temperature, humidity, altitude, etc.), usage patterns (e.g., activation and deactivation times, features that are activated by the user or are automatically activated, charging information, etc.), user preferences, and the like. This data may be collected for many individuals, stored in data repository 150 and used by the artificial intelligence and machine learning engine 155 to create power management profile that adjusting the one or more characteristics of hearing device 105 to maximize user experience while ensuring the battery will last until the next recharge cycle. Since the power consumption of hearing device 105 is heavily influenced by the user's behavior, artificial intelligence and machine learning engine 155 can take this into account.

The following table illustrates some of the performance adaptations and functionality adaptations (or customizations) that may be available and an example of user impact (if any).

| Customizable Device Characteristics | User Impact |
| --- | --- |
| Amount of sound amplification applied | High |
| Bandwidth of amplified signal | Medium |
| Codec and corresponding parameterization used for coding/encoding wireless data | Low |
| Public Announcement System Interface | Low |
| Bluetooth ® streaming from television or other device | High |
| Binaural hearing device communication | Medium |

The user impact may be different for different users and may even vary depending on the current situation of the user. For example, when the user is at home, the impact of a public announcement system interface will be low, because a user typically doesn't use a public announcement system at home. In contrast, while at the airport, the impact of being able to interface with a public announcement system may be high.

Hearing device 105 may also see changes in performance over time (e.g., from daily usage, firmware updates, etc.), rechargeable batteries may deplete more quickly, and exhibit longer cycles before recharge, and the like. In some embodiments where the learning is performed off the hearing device (e.g., in the cloud using big data/crowdsourcing), then there may be a chance to monitor and adapt to such changes over time. In accordance with various embodiments, the estimation algorithms may be configured to be robust or at least conservative to ensure the battery lasts until the next recharge cycle. Some embodiments may allow for direct connectivity of hearing device 105 to the Internet, (e.g., without going through Bluetooth® to a smartphone). In these embodiments, the smartphone or other external computing device (e.g., wearable, tablet, computer, etc.) may merely be used to control/parameterize the proactive power management, while much of the computation may move to the cloud.

Figure 2:
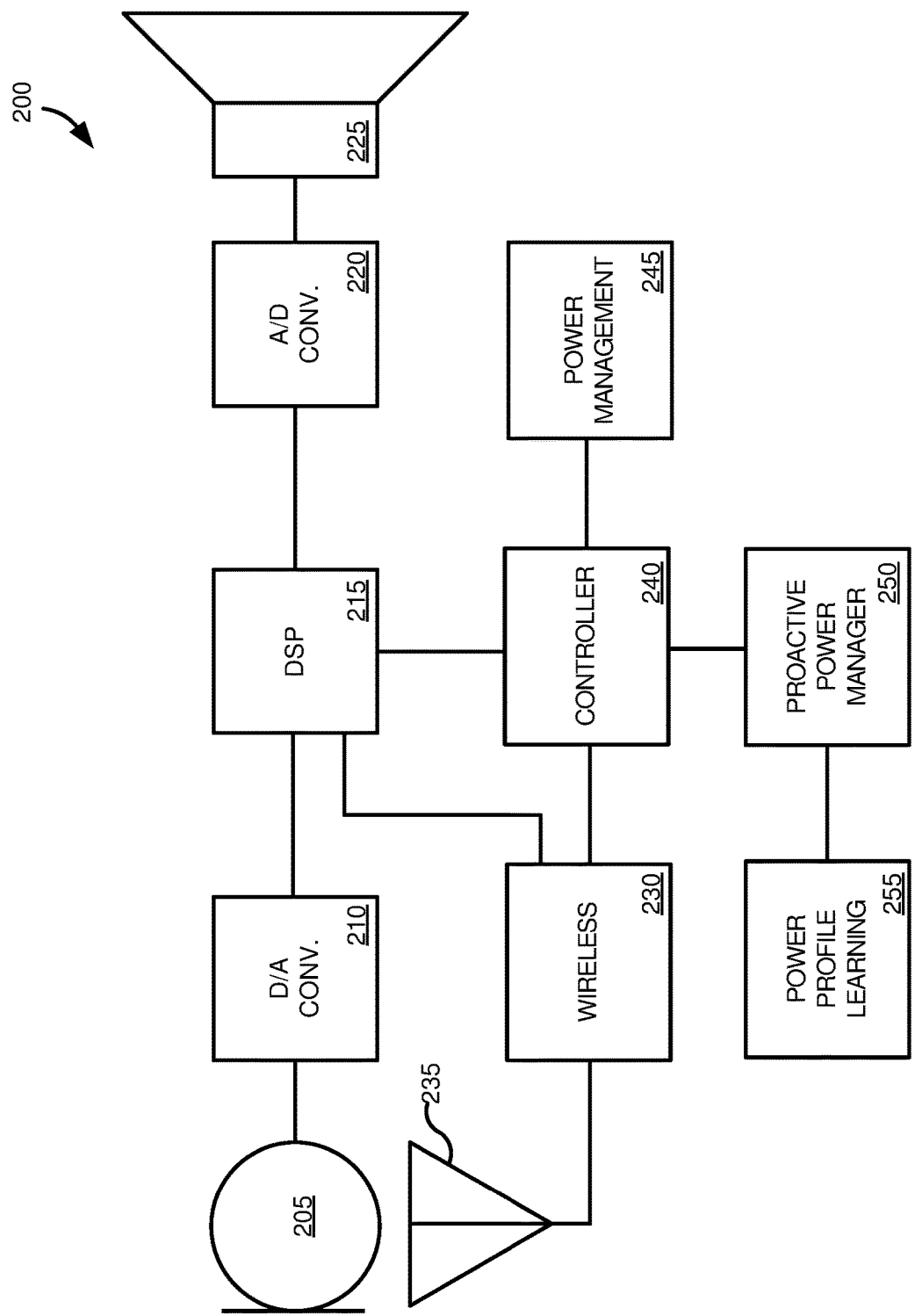
FIG. 2 illustrates a set of components within a hearing device according to one or more embodiments of the present technology.

FIG. 2 illustrates a set of components within a hearing device according to one or more embodiments of the present technology. As shown in FIG. 2, hearing device 200 may include microphone 205, digital to analog converter 210, digital signal processor 215, analog to digital converter 220, speaker 225, wireless module 230, antenna 235, controller 240, power management module 245, proactive power manager 250, and power profile learning module 255. While not illustrated in FIG. 2, various embodiments of hearing device 105 may include additional components such as batteries (e.g., rechargeable batteries), data storage components (e.g., flash memory, volatile and/or non-volatile memories, etc.), sensors (e.g., biological sensors such as accelerometers or heart rate monitors), coprocessors, a baseband processor (e.g., to perform additional signal processing and implement/manage real-time radio transmission operations), and the like may be present. Other embodiments may include varying combinations of electronical and mechanical components. Microphone 205 can pick up the surrounding sound and translate that sound into an electrical signal which can be digitized (e.g., sampled and quantized) using digital to analog converter 210. Digital signal process 215 can process (e.g., to take into account the hearing impairment of the user of the hearing device) the digitized signal. An digital to analog converter can convert the output signal from the digital signal processor 215 into an output signal speaker 225 (acting as an electroacoustic transducer) can then produce a sound signal that can be projected into an ear canal of the user. Some hearing devices may have different configurations and features. For example, a cochlea implant may have a set of electrodes to deliver electrical impulses directly to the hearing nerve instead of a transducer.

Digital signal processor 215 can be communicably coupled to wireless module 230 which can use antenna 235 to transmit and receive wireless signal outside of hearing device 200. For example, in some embodiments wireless module 230 may provide communication using ZigBee, Bluetooth®, Bluetooth® Low Energy (BTLE), Ultra-wideband, or other personal area network communication technologies. In some embodiments, wireless module 230 may directly provide networking connections directly to cellular networks (e.g., 5G networks).

Controller 240 can be configured to implement a modification of one or more operational characteristics of hearing device 200 based on input from power management module 245 and proactive power manager 250. The operational characteristics can include performance adaptations and/or functionality adaptations. The performance adaptation can include, for example, a reduction in an amount of sound amplification, reduction or shift in bandwidth of an amplified signal, a change in a codec type, or reduction of frequency of monitoring sensors. The functionality adaptation can include, for example, a reduction in wireless functionality, a reduction in supported wireless protocols, reduction in monitoring for the presence of an inductive loop. Power management module 245 can be configured to set operational characteristics based on detection of various triggers. For example, when the battery level reaches a certain level (e.g., ten percent), power management module can implement the preconfigured power profiles.

Proactive power manager 250 can dynamically set a power profile with customized operational characteristics. In some embodiments, proactive power manager 250 can monitor various system states (e.g., remaining battery capacity, age of battery, temperature, current hardware and/or software configurations/activity, etc.), user activity (e.g., historical activity, predicted activity, location, calendar, etc.), user preferences, predictions to next recharge, and/or other factors. This information can be used to create customized power profile that is unique to the user and changes based on the situation. In some embodiments, power profile learning module 255 can use artificial intelligence or machine learning to learn about the user.

Figure 3:
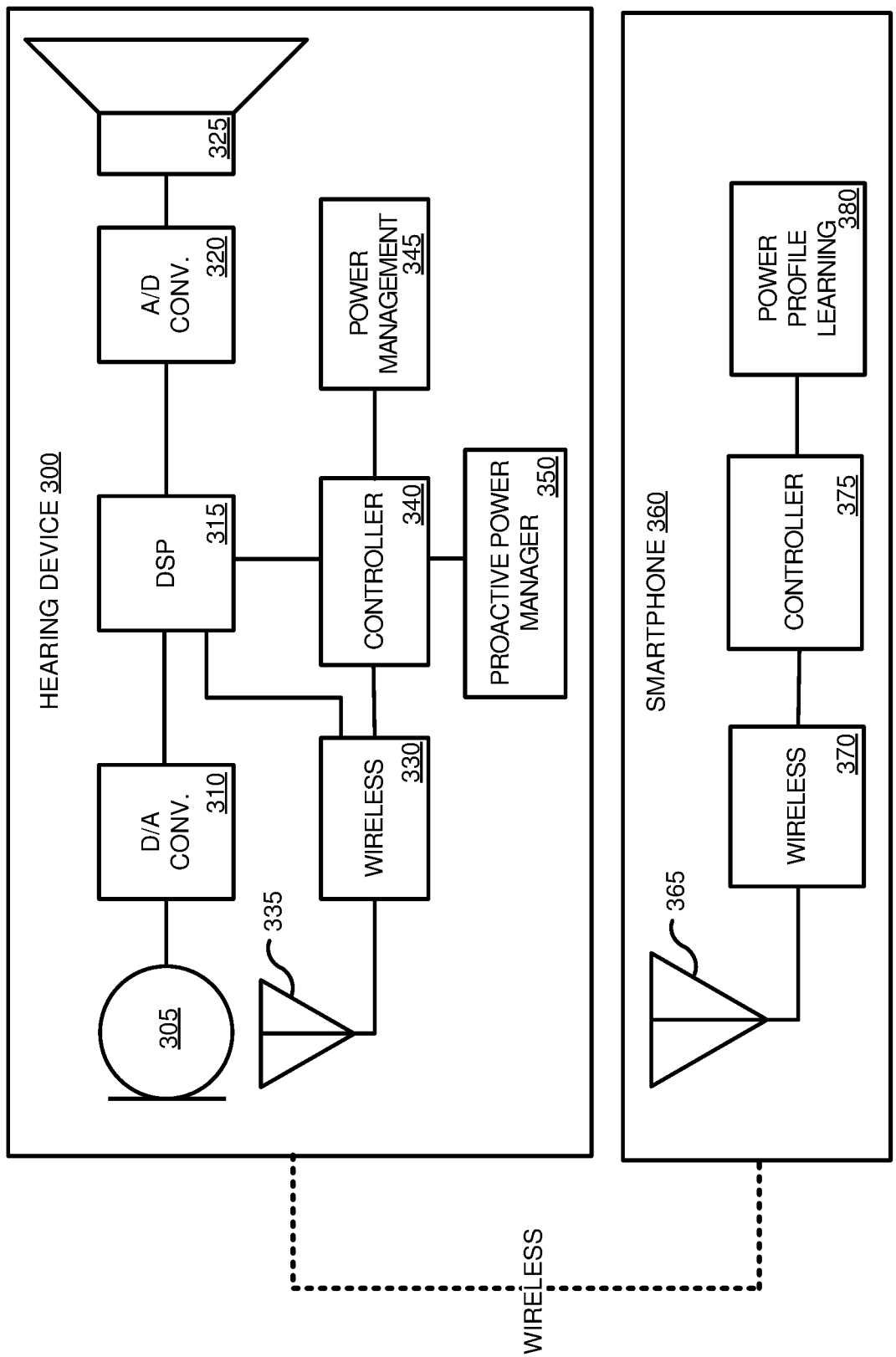
FIG. 3 illustrates a set of components within a hearing device and a mobile device according to one or more embodiments of the present technology.

FIG. 3 illustrates a set of components within a hearing device 300 and a mobile device or smartphone 360 according to one or more embodiments of the present technology. Similar to hearing device 200 in FIG. 2, hearing device 300 may include microphone 305, digital to analog converter 310, digital signal processor 315, analog to digital converter 320, speaker 325, wireless module 330, antenna 335, controller 340, power management module 345, and proactive power manager 350. These components may operate similar to the descriptions in FIG. 2. In the embodiments illustrated in FIG. 3, power profile learning module 355 is associated with smartphone 360 (e.g., an application running on one or more processors of smartphone 360).

Wireless module 330 can use antenna 335 to create a wireless connection or link with smartphone 360 via antenna 365 and wireless module 370. Controller 375 can instruct wireless module 370 to transmit profile information created by power profile learning module 380 to hearing device 300 via the wireless link. Power profile learning module 380 can have access to various information via smartphone 360. This information can come from sensor data (e.g., accelerometers, microphones, etc.), global positioning system data, calendar information, texts or e-mails, and/or other data can be analyzed by power profile learning module 380. The additional information available via smartphone 360 can be ingested and included as part of the user's profile and can act as additional input in creating the customized power plan that can modify or adjust one or more operational characteristics. In some embodiments, hardware and software configurations of hearing device 300 may also be used as inputs to power profile learning module 380.

In some embodiments, power profile learning module 380 can use artificial intelligence or machine learning to learn about the user, predict a user's activity, and/or predict remaining battery life of hearing device 300 under different operating scenarios (e.g., with different operational characteristics). The geolocation information may help the estimation of the remaining usage time as well as the estimation of the time till the next charge. In addition, the operational characteristics within the power profile can be modified based on various events, timing, or other triggers. For example, certain features may be completely deactivated while the user is in a certain location. These features can then be activated (and potentially a different set deactivated) when the user is in the specified location (e.g., the individual's home). As such, the power profile becomes a dynamically updated schedule to maximize the user experience while minimizing battery drain.

Figure 4:
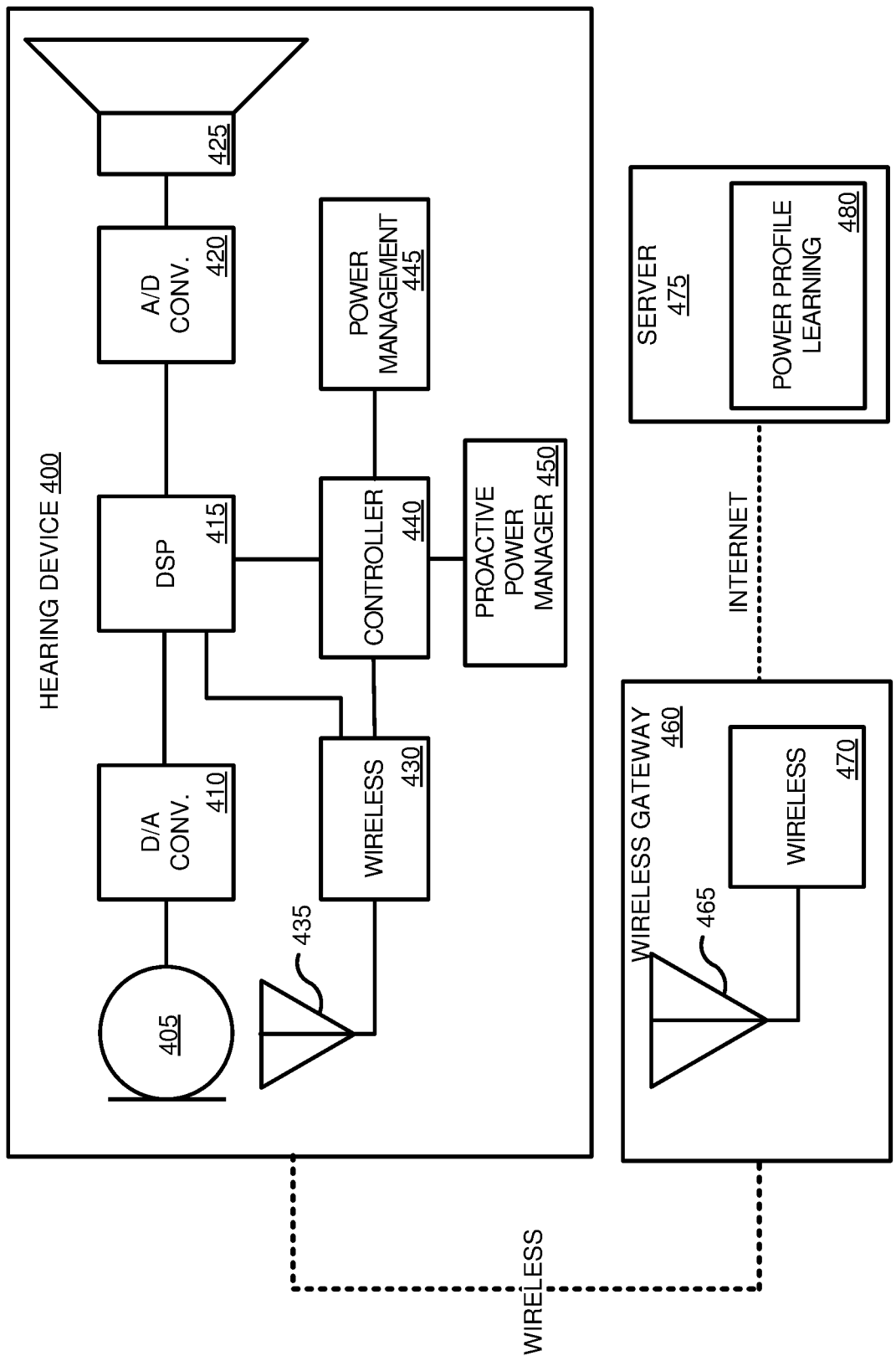
FIG. 4 illustrates a power profile learning component implemented in a server that is accessible through the Internet directly from the hearing device or indirectly through a device like a smartphone according to one or more embodiments of the present technology.

FIG. 4 illustrates a power profile learning component implemented in a server that is accessible through the Internet directly from the hearing device or indirectly through a device like a smartphone according to one or more embodiments of the present technology. Similar to hearing device 200 in FIG. 2, hearing device 400 may include microphone 405, digital to analog converter 410, digital signal processor 415, analog to digital converter 420, speaker 425, wireless module 430, antenna 435, controller 440, power management module 445, and proactive power manager 450. These components may operate similar to the descriptions in FIG. 2. In the embodiments illustrated in FIG. 4, the power profile learning module 480 can be implemented in server 475 and accessible (e.g., through the Internet) directly from the hearing device or indirectly through wireless gateway 460 (e.g., a smartphone).

One benefit of running power profile learning module 480 remotely (e.g., in the Cloud) is that the server has a higher performance than both hearing 400 and a smartphone, tablet, or computer. In addition, some embodiments allow for learning from potentially many users. As a result of a broader data pool, the estimates of remaining usage time and time till next charge may be more accurate as the machine learning and artificial intelligence engines can make inferences from the large data. In accordance with various embodiments, server 475 can communicate with hearing device 400 indirectly via wireless gateway 460 as illustrated in FIG. 4 or directly with hearing device 400. The power consumption from the additional communications will need to be taken into account when estimating battery life and consumption patterns. The latency introduced by the communication link via the wireless gateway may be tolerable. However, such a configuration is not without risks of losing communication with remote server 475. As such, some embodiments, may distribute the functionality across hearing device 400, wireless gateway 460, and/or server 475 so that at least some scaled version of the proactive management may be available even in the absence of a stable communication link.

Figure 5:
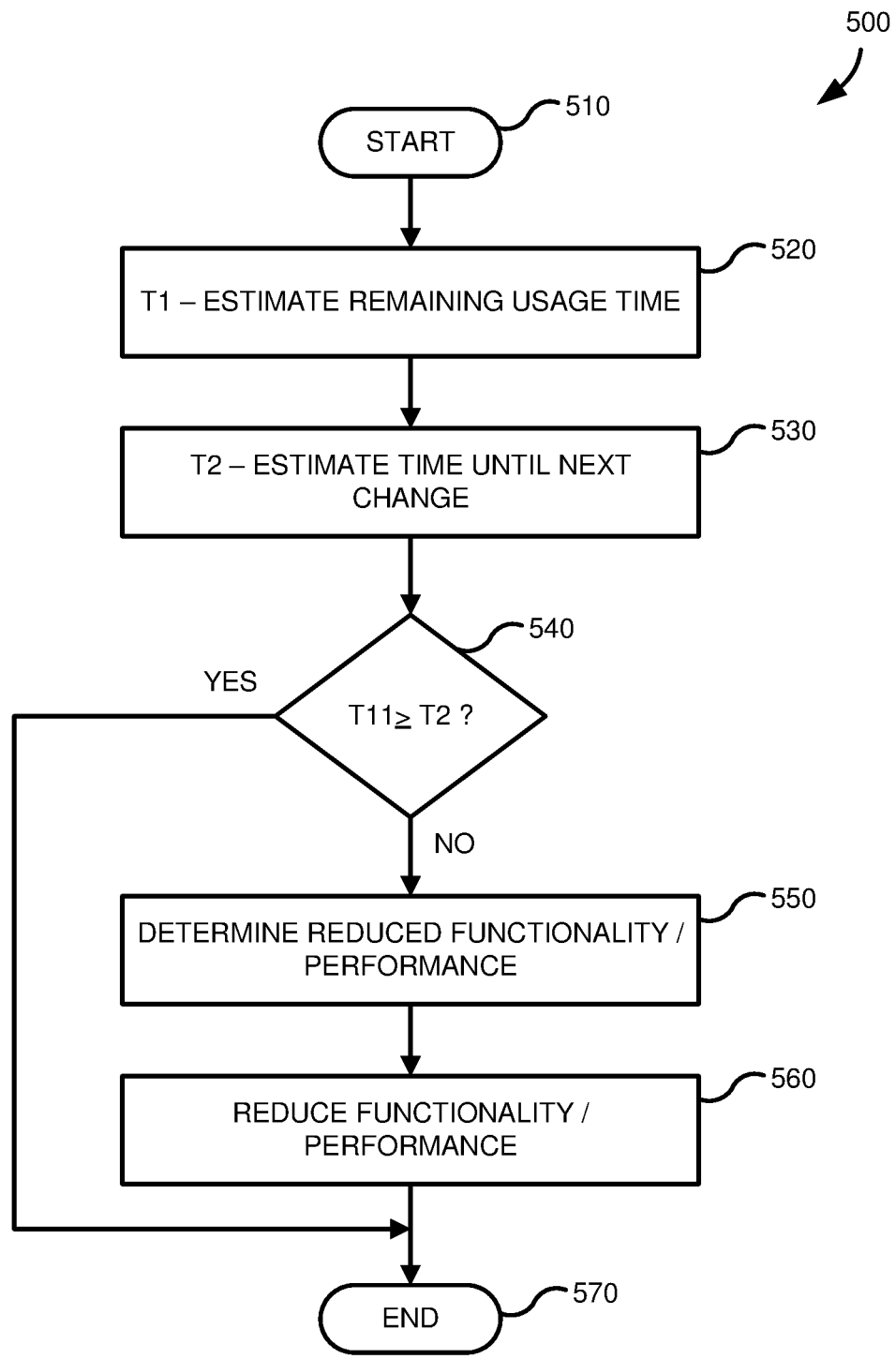
FIG. 5 is a flowchart illustrating a set of operations for dynamically reducing one or more characteristics of a hearing device in accordance with some embodiments of the present technology.

FIG. 5 is a flowchart illustrating a set of operations 500 for dynamically reducing one or more characteristics of a hearing device in accordance with some embodiments of the present technology. The operations of illustrated in FIG. 5 may be performed by a hearing device, external computing device (e.g., smartphone, wearable, tablet, etc.), a remote server, and/or one or more components thereof such as a processor, DSP, or the like. As illustrated in FIG. 5, initiation operation 510 starts the process of proactive power management. This may happen for example, when the hearing device is activated, the hearing device connects with an external computing device or server, when calendar event entries are added or deleted, on a predefined schedule (e.g., a periodic schedule), when the battery power reaches a threshold (e.g., 75%, 50%, 40%, etc.), or some other triggering event.

During estimation operation 520, an estimate (T1) of the remaining usage time is identified. This could be done, for example, by computing remaining battery charge/capacity vs. needed charge/capacity. In general, a variety of factors can be used to create the estimate of the remaining usage time (see, e.g., factors illustrated in FIG. 9). The time (T2) until next charge can be estimated during estimation operation 530. A variety of factors can be used to create the estimate of time until next charge (see, e.g., factors illustrated in FIG. 8). Determination operation 540 can then determine whether the remaining usage time is greater than or equal to the time (T2) until the next charging cycle is initiated.

When determination operation 540 determines that the estimate (T1) of remaining usage time is less than the time (T2) until the next charging cycle is initiated, the determination operation 540 branches to reduction operation 550 where performance profile is identified (e.g., using machine learning) that will reduce the power consumption so the hearing device is likely to have power until the next charging cycle is initiated. Implementation operation 560, implements the performance profile on the hearing device (e.g., by sending instructions to a controller, DSP, or other component of the hearing device responsible for changing the operational characteristics. The operational characteristics can be performance adaptations or functionality adaptations. When determination operation 540 determines that the estimate (T1) of remaining usage time is greater than or equal to the time (T2) until the next charging cycle is initiated, the determination operation 540 branches to termination operation 570 while making no changes to the operational characteristics of the hearing device.

Figure 6:
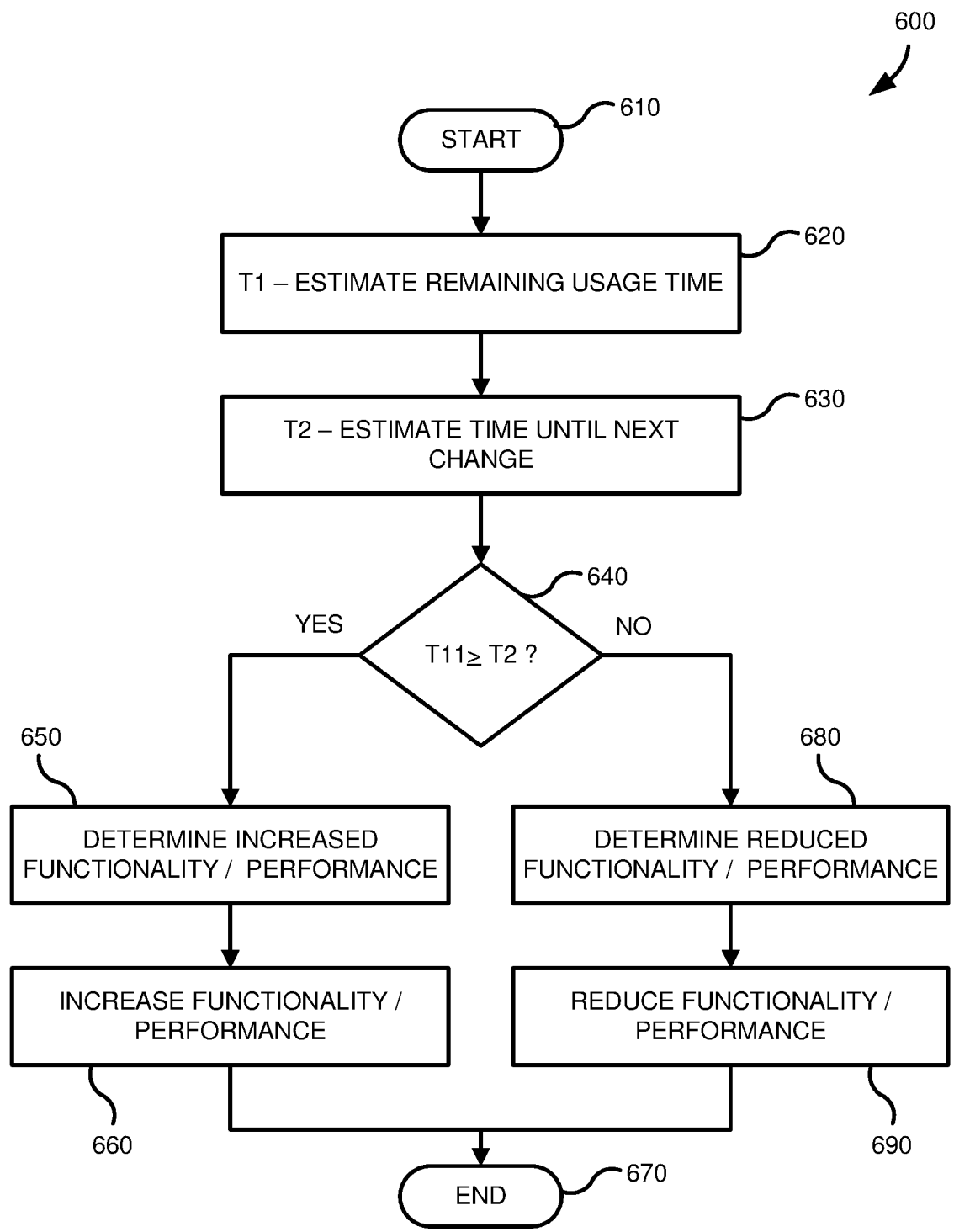
FIG. 6 is a flowchart illustrating a set of operations dynamically adapting one or more operational characteristics of a hearing device for proactive management of a battery in accordance with one or more embodiments of the present technology.

FIG. 6 is a flowchart illustrating a set of operations 600 for dynamically modifying one or more operational characteristics for proactive management of a battery in accordance with one or more embodiments of the present technology. The operations of illustrated in FIG. 6 may be performed by a hearing device, external computing device (e.g., smartphone, wearable, tablet, etc.), a remote server, and/or one or more components thereof such as a processor, DSP, or the like. As illustrated in FIG. 6, initiation operation 610 starts the process of proactive power management that can increase or decrease functionality. This may happen for example, when the hearing device is activated, the hearing device connects with an external computing device or server, on a predefined schedule (e.g., a periodic schedule), when calendar event entries are added or deleted, when the battery power reaches a threshold (e.g., 75%, 50%, 40%, etc.), or some other triggering event.

During estimation operation 620, an estimate (T1) of the remaining usage time is identified. A variety of factors can be used to create the estimate of the remaining usage time (see, e.g., factors illustrated in FIG. 9). The time (T2) until next charge can be estimated during estimation operation 630. A variety of factors can be used to create the estimate of time until next charge (see, e.g., factors illustrated in FIG. 8). Determination operation 640 can then determine whether the remaining usage time is greater than or equal to the time (T2) until the next charging cycle is initiated.

When determination operation 640 determines that the estimate (T1) of remaining usage time is greater than (or equal to) the time (T2) until the next charging cycle is initiated, the determination operation 640 branches to enhancement operation 650 where a performance profile is identified (e.g., using machine learning) that will increase functionality or performance of the hearing device (and therefore the power consumption) so the hearing device maximizes functionality and/or performance while ensuring the battery will last until the estimated recharge cycle is initiated. Once the performance profile is identified, then implementation operation 660 implements the adaptations resulting in the increased performance and/or functionality.

When determination operation 640 determines that the estimate (T1) of remaining usage time is less than the time (T2) until the next charging cycle is initiated, the determination operation 640 branches to reduction operation 650 where a performance profile is identified (e.g., using machine learning) that will reduce the power consumption so the hearing device is likely to have power until the next charging cycle is initiated. The performance profile can be implemented using implementation operation 690 so that the hearing device will consume power at a rate to ensure the hearing device lasts until the anticipated recharge cycle is initiated.

The estimates (T1 and T2) may be updated over time indicating that the hearing device will last longer or run out of battery sooner than expected or the recharge estimate changes. When the hearing device performance or functionality was previously reduced due to a more pessimistic estimate, the performance or functionality may actually be increased again. Depending on the comparison of the estimates, the performance or functionality can change multiple times. Various embodiments may use some hysteresis to avoid thrashing between decreased and increased functionality and/or performance.

While not illustrated in FIG. 6, reduction operation 680 may fail to identify a performance profile that will ensure the hearing device will last until the anticipated recharge cycle. In those situations, some embodiments may generate notifications to the user. The notifications can be audible messages played through the hearing device or messages that are displayed on a connected mobile phone or computing device. These messages may include an indication of the maximum device life based on the current state of the battery. For example, the notifications could indicate that only one hour of device life is left. The user could then decide to power down the device, thereby saving the available battery power for the most important situations. In some embodiments, an application running on the phone may provide an easy interface to allow for quick standby (or power down) modes and reactivation.

Figure 7:
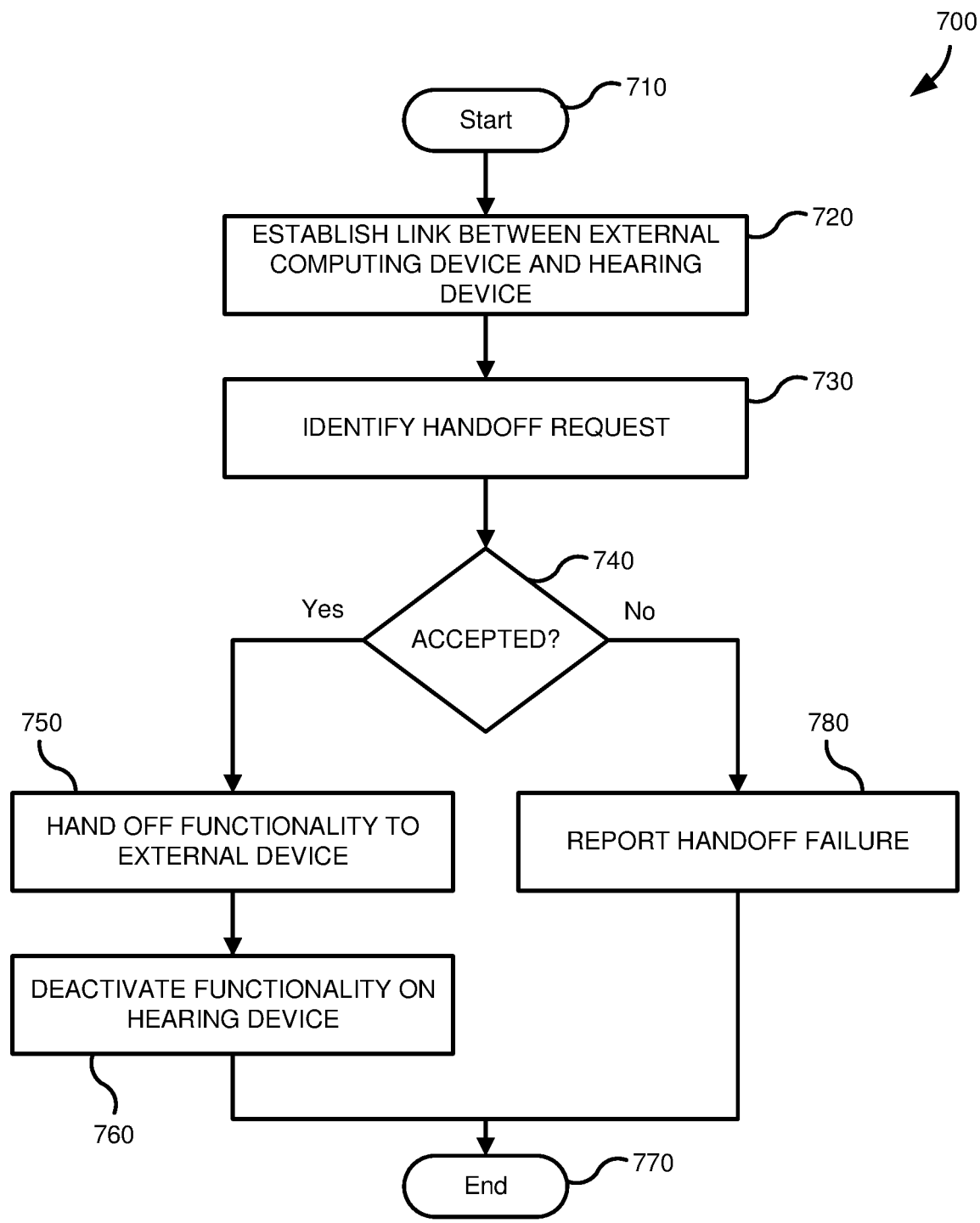
FIG. 7 is a flowchart illustrating a set of operations for handing off functionality of a hearing device to an external computing device in accordance with some embodiments of the present technology.

FIG. 7 is a flowchart illustrating a set of operations 700 for handing off functionality of a hearing device to an external computing device in accordance with some embodiments of the present technology. In some embodiments, the power profile created may indicate that one or more functionalities should be handed off to an external computing device for the purpose of extending the battery life. This can trigger the initiation operation 710 which starts the functional hand-off. Linking operation 720 can establish a link between the external computing device and the hearing device (or confirm that a link has already been established). Identification operation 730 identifies the handoff request and the related functionality which is communicated to each device.

When acknowledgement operation 740 confirms that the handoff request has been accepted, the corresponding functionality can be started on the external deice during handoff operation 750 and then deactivated on the hearing device during deactivation operation 760. The process is terminated with termination operation 770. When acknowledgement operation 740 indicates that the request was not accepted (e.g., because a needed feature was not available on the external device), then acknowledgement operation branches to reporting operation 780, where the handoff failure can be reported, and an alternate power profile can be created.

Figure 8:
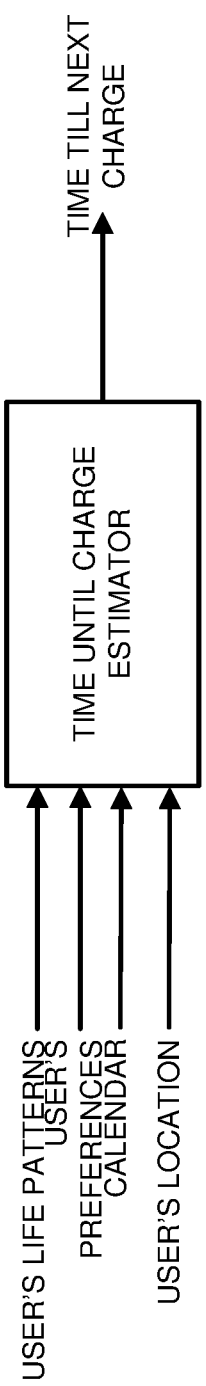
FIG. 8 illustrates various factors for computing a time to initiation of a recharge cycle according to various embodiments of the present technology.

FIG. 8 illustrates various factors for computing a time to initiation of a recharge cycle according to various embodiments of the present technology. As illustrated in FIG. 8 factors that can be used to determine the power consumption of the hearing device and thus the rate of depletion of the battery can include user's life patterns, user's preferences, calendar entries, user's location, and the like. As shown in FIG. 8, the various factors (and others not shown) can flow into (or be ingested by) an estimator for remaining usage time. Some additional factors are listed in the following table.

TABLE 1

Parameters influencing remaining usage time

| Type | Parameter | Description |
| --- | --- | --- |
| Performance | Remaining battery capacity | changes over time, also with aging of battery |
| | Age of battery | the older the battery the less capacity |
| | Amount of sound amplification applied | the larger the amplification the larger the power consumption |
| | Bandwidth of amplified signal | amplification of lower frequency sounds |
| | Codec and its parameterization used for coding/encoding wireless data | Trade-off audio quality vs. power consumption |
| | Time of usage since last recharge | how long the hearing a device s have been used since the last charge cycle |
| | Frequency at which sensors are evaluated | trade-off sensor precision vs. power consumption, e.g. how often the hearing device searches for wireless networks |
| Functional aspects | Hearing device programs (configurations) | certain hearing device configurations consume more power than others, e.g. binaural vs. monaural beamformers |
| | Number/type of wireless protocols, wireless performance | number and type of wireless networks supported, e.g. Bluetooth Classic vs. Bluetooth LE, support for inductive loop, speeds of wireless communication, reduced range |
| | Wireless features supported | functionality supported over wireless links, e.g. audio streaming consumes more than simple remote control |
| | Noise cancellation | enhance the signal-to-noise ratio of the audio signal by suppressing noise. |
| User behavior | User's calendar | calendar schedule of hearing device user. Depending on the tasks the user needs to perform, e.g. a meeting in a restaurant over lunch, the power consumption will vary |
| | User's location | the locations (quiet or noisy environment) in which the hearing device s are used, e.g. provided by GPS data or other localization data influences |
| | User's preferences | the user's preferences, e.g. using certain (power-hogging) hearing device programs more often than others |

Figure 9:
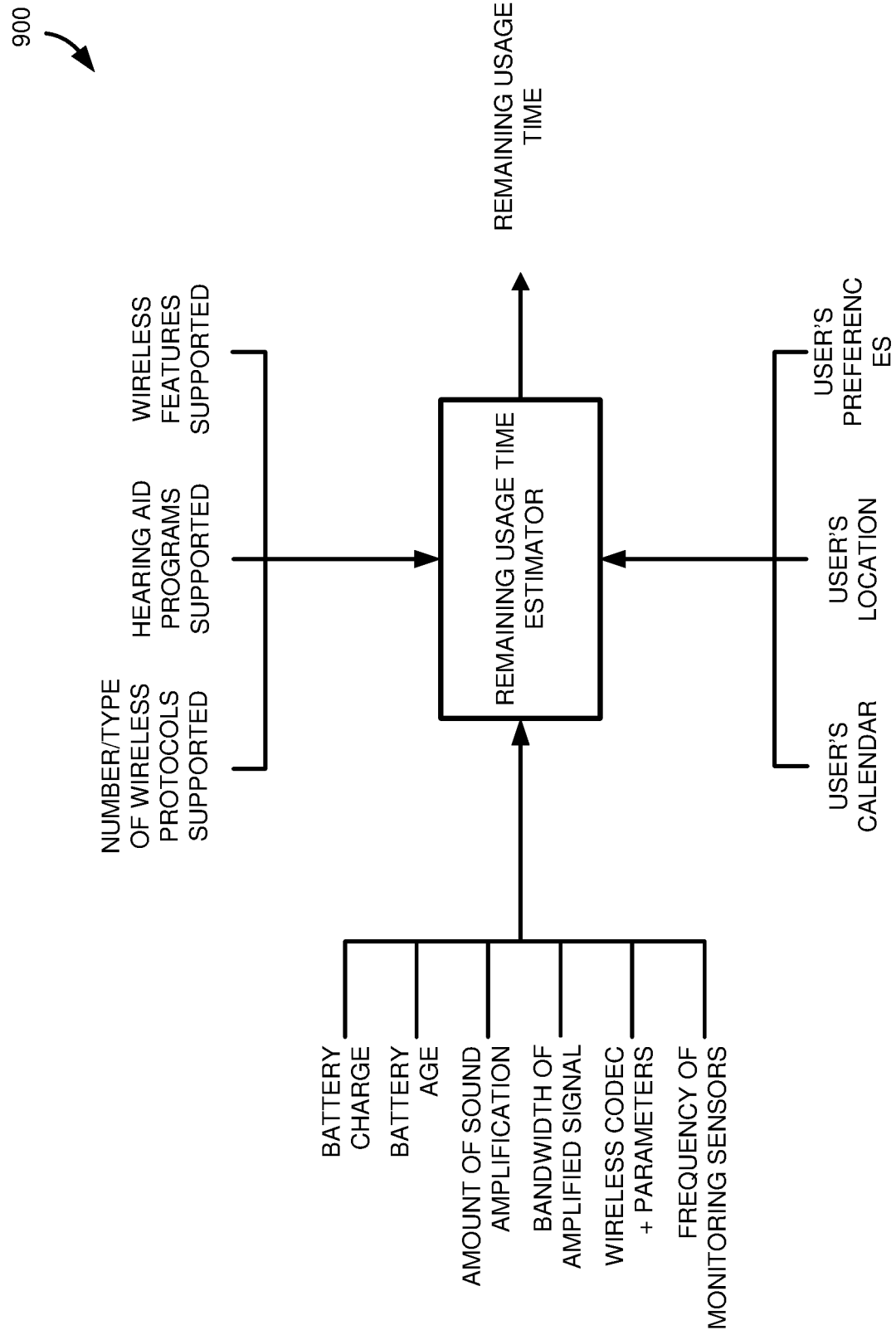
FIG. 9 illustrates various factors for estimating a remaining usage time of the hearing device according to various embodiments of the present technology.

FIG. 9 illustrates various factors for estimating a remaining usage time of the hearing device according to various embodiments of the present technology. The time till charge estimator shown in FIG. 9 can generate an estimate on when the hearing a device will next be charged by the user. In some embodiments, the system can include a model which allows the system to estimate the time until the hearing device will be charged again. Several factors contribute to this estimate: the general life patterns of the hearing device user, e.g. average time of the day when the hearing device is charged, weekday vs. weekend charging time, the location of the hearing device, e.g. vacation behavior vs. work day behavior, the schedule (calendar) of the hearing device user, e.g. birthday vs. regular work day, late meetings, date/time of the estimation, summer vs. winter behavior (watch more TV in winter), week vs. weekend (work vs. time off), time of day (watch TV in the evenings), time of usage since last recharge.

Adaptation of the hearing device functionality can be used both for reducing power consumption by reducing the performance of functionality of the hearing device or by reducing the functionality itself. The reductions (or re-instantiations) may be done based on the user's behavior, (e.g., rarely used functionality is reduced before often used functionality). The system may learn the user's behavior (e.g. if wireless functionality is rarely used, this may be the first feature reduced). Reductions may also be done based on the user's preferences (e.g., the user determines the priority of functionality to be reduced) in some embodiments. Some embodiments can adapt the behavior according to the user's preferences. In some embodiments, the user of the hearing device can explicitly request to use certain features or performance levels, which had already been reduced. The system may or may not grant the user's request. The functionality that may be reduced may be configurable, e.g. the user configures to still be able to receive phone calls, but may prefer the system to block media streaming.

Some embodiments may use performance adaptations such as reducing the amount of sound amplification applied. The user may not have the same level of intelligibility of audio signals, but such performance may be sufficient to get through the day. As another example, some embodiments may reduce or shift the bandwidth of the amplified signal such that frequency ranges whose amplification consumes a lot of power are avoided (e.g., low frequencies consume more power to amplify than higher frequencies). Still yet, some embodiments can change the codec type or corresponding parameterization used for coding/decoding audio signals transmitted or received wirelessly such that a less power-consuming configuration is used, trading off audio quality. Some embodiments may reduce the frequency of monitoring sensors, e.g. searching for an inductive loop signal, scanning for wireless broadcast sources, movement sensors, or scanning for peer devices.

Some embodiments may use functionality adaptations. For example, some embodiments may reduce wireless functionality (e.g. no more audio streaming, no more remote control, no more binaural communication between a pair of hearing devices, no wireless communication at all, etc.). A reduction in the supported wireless protocols (e.g., only Bluetooth, only proprietary binaural protocol, etc.) may be used. As another example, some embodiments may stop monitoring for the presence of an inductive loop (unless explicitly requested by the user) or avoid using hearing device configurations that are known to consume more power.

As both the person's behavior as well as the hearing device (aging battery, change in fitting) may change over time, some embodiments can track (or learn) the person's behavior and/or the hearing device behavior to maintain good adaptation performance. Some embodiments may use both a short-term aspect (daily schedule) and a long-term learning (trends). Various learning algorithms such as a least mean square (LMS) algorithms may be used in one or more embodiments. In some embodiments, learning can be done on the hearing device (e.g. for short-term (quick) adaptation). Learning can also be done on a mobile device, where access to the user's calendar, date and time, geolocation, additional sensors are available. Also, the mobile device typically has orders of magnitude more processing power and memory than a hearing device. In some embodiments, learning can be done in the cloud for long-term adaptation and for clustering of multiple user's behavior and usage can be done to provide better models/estimators.

In some embodiments the hearing devices may include biological sensors as part of the information that allows the estimator to estimate the usage time. These sensors may provide indications of the user's behavior. For example, the biological sensors can include an accelerometer or heart rate monitor indicating that the user is actively doing sports. In this situation, the hearing device could consume more power connecting to a phone outside than in a building since there are less reflections. Similarly, a temperature sensor can be used to indicate that the user has fever and is likely to be lying down.

Exemplary Computer System Overview

Aspects and implementations of the proactive power management system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 10:
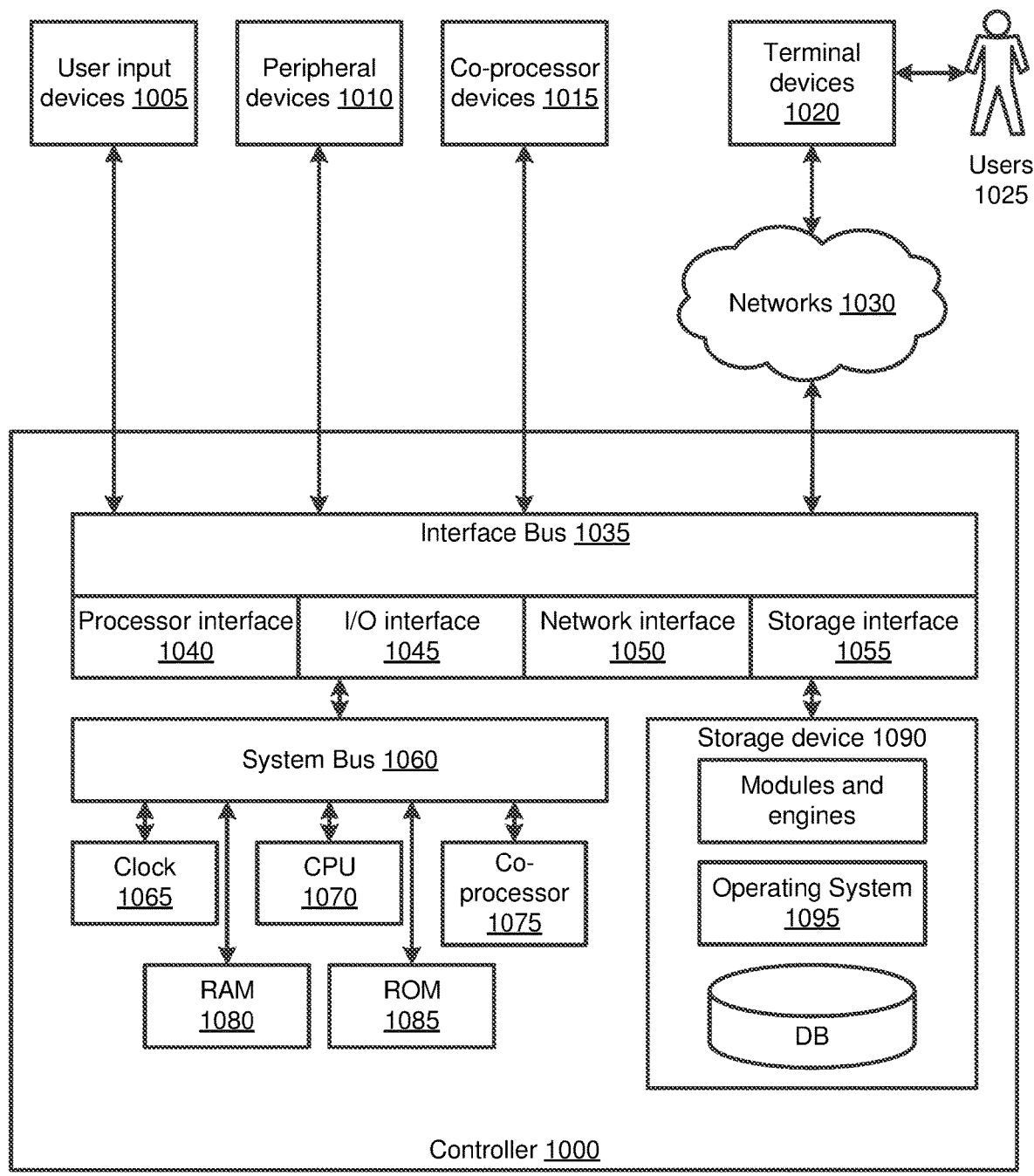
FIG. 10 illustrates an example of a computing device that may be used in one or more embodiments of the present technology.

FIG. 10 is a block diagram illustrating an example machine representing the computer systemization of the proactive power management service. The controller 1000 may be in communication with entities including one or more users 1025 client/terminal devices 1020, user input devices 1005, peripheral devices 1010, an optional co-processor device(s) (e.g., cryptographic processor devices) 1015, and networks 1030. Users may engage with the controller 1000 via terminal devices 1020 over networks 1030.

Computers may employ central processing unit (CPU) or processor to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 1000 may include clock 1065, CPU 1070, memory such as read only memory (ROM) 1085 and random-access memory (RAM) 1080 and co-processor 1075 among others. These controller components may be connected to a system bus 1060, and through the system bus 1060 to an interface bus 1035. Further, user input devices 1005, peripheral devices 1010, co-processor devices 1015, and the like, may be connected through the interface bus 1035 to the system bus 1060. The interface bus 1035 may be connected to a number of interface adapters such as processor interface 1040, input output interfaces (I/O) 1045, network interfaces 1050, storage interfaces 1055, and the like.

Processor interface 1040 may facilitate communication between co-processor devices 1015 and co-processor 1075. In one implementation, processor interface 1040 may expedite encryption and decryption of requests or data. Input output interfaces (I/O) 1045 facilitate communication between user input devices 1005, peripheral devices 1010, co-processor devices 1015, and/or the like and components of the controller 1000 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 1050 may be in communication with the network 1030. Through the network 1030, the controller 1000 may be accessible to remote terminal devices 1020. Network interfaces 1050 may use various wired and wireless connection protocols such as, direct connect, Ethernet, wireless connection such as IEEE 802.11a-x, and the like.

Examples of network 1030 include the Internet, Local Area Network (LAN), Metropolitan Area Network (MAN), a Wide Area Network (WAN), wireless network (e.g., using Wireless Application Protocol WAP), a secured custom connection, and the like. The network interfaces 1050 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 1055 may be in communication with a number of storage devices such as, storage devices 1090, removable disc devices, and the like. The storage interfaces 1055 may use various connection protocols such as Serial Advanced Technology Attachment (SATA), IEEE 1394, Ethernet, Universal Serial Bus (USB), and the like.

User input devices 1005 and peripheral devices 1010 may be connected to I/O interface 1045 and potentially other interfaces, buses and/or components. User input devices 1005 may include card readers, finger print readers, joysticks, keyboards, microphones, mouse, remote controls, retina readers, touch screens, sensors, and/or the like. Peripheral devices 1010 may include antenna, audio devices (e.g., microphone, speakers, etc.), cameras, external processors, communication devices, radio frequency identifiers (RFIDs), scanners, printers, storage devices, transceivers, and/or the like. Co-processor devices 1015 may be connected to the controller 1000 through interface bus 1035, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 1000 may employ various forms of memory including on-chip CPU memory (e.g., registers), RAM 1080, ROM 1085, and storage devices 1090. Storage devices 1090 may employ any number of tangible, non-transitory storage devices or systems such as fixed or removable magnetic disk drive, an optical drive, solid state memory devices and other processor-readable storage media. Computer-executable instructions stored in the memory may include the data service 120 having one or more program modules such as routines, programs, objects, components, data structures, and so on that perform particular tasks or implement particular abstract data types. For example, the memory may contain operating system (OS) component 1095, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The controller 1000 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 1000 may be distributed electronically over the Internet or over other networks (including wireless networks). Those skilled in the relevant art(s) will recognize that portions of the system may reside on a server computer, while corresponding portions reside on a client computer. Data structures and transmission of data particular to aspects of the controller 1000 are also encompassed within the scope of the disclosure.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for proactive power management of a hearing device, the method comprising:
   predicting a duration of time until a refreshing of a battery in the hearing device;
   estimating a remaining usage time of the battery in the hearing device;
   modifying, when the duration of time until the refreshing is greater than the remaining usage time, an operational characteristic of the hearing device to increase the remaining usage time of the battery in the hearing device;
   predicting an updated duration of time until the refreshing of the battery in the hearing device;
   estimating an updated remaining usage time of the battery in the hearing device; and restoring, when the updated duration of time until refreshing is less than the updated remaining usage time, the operational characteristic previously modified to increase performance in the hearing device.

2. The method of claim 1, wherein predicting the duration of time until the refreshing of the battery in the hearing device is based, at least in part, on one or more of user preferences, historical usage patterns of the hearing device, current location, or calendar entries.

3. The method of claim 1, further comprising developing an anticipated usage pattern of the hearing device during the duration of time, wherein estimating the remaining usage time of the battery in the hearing device is based, at least in part, on the anticipated usage pattern of the hearing device during the duration of time.

4. The method of claim 1, wherein estimating the remaining usage time of the battery in the hearing device is based on hardware and software configurations of the hearing device.

5. The method of claim 1, further comprising:
receiving a prioritization schedule that ranks available operational characteristics of the hearing device from a perspective of a user; and
selecting, from the prioritization schedule, the operational characteristic having a ranking indicative of lowest importance to the user.

6. The method of claim 1, wherein modifying the operational characteristic includes performing at least one of an adaptation and a functionality adaptation.

7. The method of claim 6, wherein the performance adaptation includes at least one of a reduction in an amount of sound amplification, a reduction in bandwidth of an amplified signal, a shift in the bandwidth of the amplified signal, a change in an audio codec type, and a reduction of frequency of monitoring sensors.

8. The method of claim 6, wherein the functionality adaptation includes at least one of a reduction in wireless functionality, a reduction in supported wireless protocols, and a reduction in monitoring for a presence of an inductive loop.

9. The method of claim 1, further comprising:
creating a wireless connection between the hearing device and a mobile computing device; and
off-loading one or more operational characteristics of the hearing device to the mobile computing device.

10. The method of claim 1, wherein the battery is a rechargeable battery and the refreshing of the battery includes recharging, and wherein the method further comprising restoring, after a recharging cycle of the rechargeable battery, the operational characteristic of the hearing device to a previous state.

11. A hearing device capable of optimizing battery life, the hearing device comprising:
a processor;
a rechargeable battery;
a wireless communication component configured to communicate with an external computing device;
a proactive power manager to dynamically adjust one or more operational characteristics of the hearing device to minimize a difference between a predicted time until an initiation of a recharge cycle of the rechargeable battery and an estimate of remaining usage time; and
a power learning profile module to track short-term and long-term activity and develop a usage profile indicative of usage of the hearing device.

12. The hearing device of claim 11, wherein the estimate of remaining usage time is based, at least in part, on, hardware and software configurations of the hearing device, performance of the hearing device, and user behavior.

13. The hearing device of claim 11, wherein the operational characteristics include one or more functionality adaptations and the proactive power manager is configured to off-load at least some of the one or more functional adaptations to the external computing device.

14. The hearing device of claim 11, wherein the external computing device generates the predicted time until initiation of the recharge cycle is based, at least in part, on one or more of user preferences, historical usage patterns of the hearing device, current location, or calendar entries.

15. The hearing device of claim 14, wherein the external computing device uses machine learning to generate at least one of the predicted time until initiation of the recharge cycle and the estimate of remaining usage time.

16. A method for proactive power management of a hearing device, the method comprising:
establishing a communication link between an external computing device and the hearing device;
estimating a date and time the hearing device is predicted to begin a recharge cycle;
generating a predicted time until initiation of the recharge cycle using a machine learning model based on device hardware, software configurations, and anticipated usage levels until the date and time the hearing device is precited to begin the recharge cycle; and
generating an adaption profile that when implemented will temporarily modify one or more operational characteristics to minimize a difference between the time until a next recharge cycle and a remaining usage time of a battery in the hearing device.

17. The method of claim 16, further comprising transmitting the adaptation profile to the hearing device using the communication link.

18. The method of claim 16, wherein estimating the date and time the hearing device is predicted to begin the recharge cycle is based, at least in part on, user preferences, usage patterns, current location, and calendar entries.

19. The method of claim 16, wherein the one or more operational characteristics includes a reduction in an amount of sound amplification, reduction or shift in bandwidth of an amplified signal, a change in a codec type, a reduction of frequency of monitoring sensors, a reduction in wireless functionality, a reduction in supported wireless protocols, or a reduction in monitoring for a presence of an inductive loop.

20. A hearing device capable of optimizing non-rechargeable battery life, the hearing device comprising:
a processor;
a non-rechargeable battery;
a wireless communication component configured to communicate with an external computing device;
a proactive power manager to dynamically adjust one or more operational characteristics of the hearing device to minimize a difference between a predicted time until replacement of the non-rechargeable battery and an estimate of remaining usage time; and
a power learning profile module to track short-term and long-term activity and develop a usage profile indicative of usage of the hearing device.

21. The hearing device of claim 20, wherein the one or more operational characteristics include one or more functionality adaptations and the proactive power manager is configured to off-load at least some of the one or more functional adaptations to the external computing device.

22. The hearing device of claim 20, wherein the external computing device generates the predicted time until initiation of the replacement of the non-rechargeable battery is based, at least in part, on one or more of user preferences, historical usage patterns of the hearing device, current location, or calendar entries.

* * * * *